United States Patent
Wang et al.

(10) Patent No.: US 9,478,039 B1
(45) Date of Patent: Oct. 25, 2016

(54) BACKGROUND MODELING AND FOREGROUND EXTRACTION METHOD BASED ON DEPTH IMAGE

(71) Applicant: NANJING HUAJIE IMI TECHNOLOGY CO., LTD, Nanjing (CN)

(72) Inventors: Hang Wang, Nanjing (CN); Li Li, Nanjing (CN); Shuo Li, Nanjing (CN); Yushi Guo, Nanjing (CN)

(73) Assignee: NANJING HUAJIE IMI TECHNOLOGY CO., LTD (CN)

( * ) Notice: Subject to any disclaimer, the term of this patent is extended or adjusted under 35 U.S.C. 154(b) by 0 days.

(21) Appl. No.: 15/160,067

(22) Filed: May 20, 2016

(30) Foreign Application Priority Data

Jul. 7, 2015 (CN) .......................... 2015 1 0394691

(51) Int. Cl.
*G06K 9/00* (2006.01)
*G06T 7/00* (2006.01)

(52) U.S. Cl.
CPC .......... *G06T 7/0081* (2013.01); *G06T 7/0046* (2013.01); *G06T 7/0065* (2013.01); *G06T 2207/10028* (2013.01); *G06T 2207/20144* (2013.01); *G06T 2207/20148* (2013.01)

(58) Field of Classification Search
CPC .. G06T 7/0081; G06T 7/0046; G06T 7/0065
USPC ........................................................ 382/154
See application file for complete search history.

(56) References Cited

U.S. PATENT DOCUMENTS

| | | | | |
|---|---|---|---|---|
| 2013/0084006 A1* | 4/2013 | Zhang | ................... | G06T 7/0081 382/173 |
| 2015/0077592 A1* | 3/2015 | Fahey | ................... | H04N 5/2224 348/239 |

FOREIGN PATENT DOCUMENTS

| | | |
|---|---|---|
| CN | 201110132428.8 | 5/2011 |
| CN | 201310301859.1 | 7/2013 |

OTHER PUBLICATIONS

Harville et al: "Foreground Segmentation Using Adaptive Mixture Models in Color and Depth", IEEE, 2001.*
Kim, Kyungnam et al., "Rea-time foreground-backgroun segmentation using codebook model", ResearchGate, Real-Time Imaging, Elsevier Ltd., Jun. 2005; www.sciencedirect.com, pp. 1-14.
Notification of Patent Allowance for Invention Patent Application and English translation from corresponding applciation No. CN201510394691.2.

* cited by examiner

*Primary Examiner* — Ruiping Li
(74) *Attorney, Agent, or Firm* — Hauptman Ham, LLP (57) ABSTRACT

The present invention relates to an image background modeling and foreground extraction method based on a depth image, characterized by comprising: step 1: acquiring a depth image representing a distance from objects to a camera; step 2: initiating a real-time depth background model; step 3: updating the real-time depth background model; step 4: acquiring a current depth image representing the distance from the objects to the camera; step 5: extracting a foreground image of the current depth image based on the real-time depth background model; step 6: outputting the foreground image and generating a real-time target masking image; and step 7: updating the real-time depth background model, where code block information of each pixel point in the real-time depth background model is updated according to the real-time target masking image. The present invention has stability, high efficiency, and superiority in processing positional relationships that cannot be matched by a well-known modeling method using a color image, and does not require initially modeling a scene, thereby simplifying implementation steps and greatly improving the whole performance.

12 Claims, 2 Drawing Sheets

BACKGROUND MODELING AND FOREGROUND EXTRACTION METHOD BASED ON DEPTH IMAGE

BACKGROUND OF THE INVENTION

1. Field of the Invention

The present invention relates to the field of computer image processing technology, and more particularly to an image background modeling and foreground extraction method based on a depth image.

2. Description of Related Art

At present, image sources in background modeling and foreground extraction are mainly color images. Background modeling and foreground extraction methods for color images are mainly Gaussian background modeling, codebook background modeling, and the like. The existing methods of modeling a color image mainly have the following problems: firstly, background information is distinguished from foreground information simply according to color changes and positional relationships between targets in the image cannot be embodied; secondly, the color image is greatly influenced by light and external environment, which greatly influences the results of the foreground extraction, resulting in poor stability; and thirdly, a data volume of a single pixel point in the color image is large, so that the operation efficiency in the modeling process is low.

The paper "Real-Time Foreground-Background Segmentation Using Codebook Model" (Kyungnam Kim, Thanarat H. Chalidabhongse, David Harwood, Larry Davis, 2005, Elsevier) provides a solution, which has advantages that a background model can be built in a color video stream and a foreground target can be surely extracted by an algorithm in real time, but still has obvious disadvantages. For example, extraction of foreground objects in a color image is easily influenced by light and texture. For example, in a dark room, the background modeling and foreground extraction based on a color image have a poor effect. Also, with the background modeling method in the paper, a process of initially modeling a scene is required before an accurate foreground extraction can be performed, thereby influencing user experience in actual practice.

"Three-Dimensional Scene Analysis" is disclosed in Chinese patent application No. 201110132428.8, where two depth images are used in a background model. Through the method, target extraction based on a depth image can be effectively performed, but the following obvious disadvantages still exist: firstly, through the method, a more complex background model, for example, a regularly moving background (for example, a rotating electric fan, also present as a background model) cannot be processed; and secondly, the background model is not updated in real time, where the method is based on a hypothesis of a static background and cannot process more complex background changes.

"Foreground and Feature Extraction Method Based on Outline Difference and Block Dominant Orientation Histogram" is disclosed in Chinese patent application No. 201310301859.1, where in the method, a moving object is located according to an outline difference between an original video and a background image obtained by background modeling to retain the outline of the moving object, and a gradient histogram feature based on a block dominant orientation is extracted by using gradient information without a background in combination with a block dominant gradient orientation, to overcome the disadvantage of over-dependence on local detail features. Through the method, target extraction in a complex background can be effectively performed so that the accuracy rate of foreground extraction and feature classification is up to 94.04%, but the following obvious disadvantages still exist: firstly, the present patent is based on a built background model, and the situation that a background model is not initially provided cannot be processed; and secondly, the calculation amount is large, where a gradient feature needs to be calculated and identification using a classifier is required.

Accordingly, how to overcome the disadvantages of the existing techniques has become one of important problems to be solved currently in the field of computer image processing technology.

SUMMARY OF THE INVENTION

In order to overcome the disadvantages in the prior art, the present invention provides an image background modeling and foreground extraction method based on a depth image, which has stability, high efficiency, and superiority in processing positional relationships that cannot be matched by a well-known modeling method using a color image, and does not need to initially model a scene, thereby simplifying implementation steps and greatly improving the whole performance.

An image background modeling and foreground extraction method based on a depth image provided by the present invention is characterized by comprising step 1 to step 7, wherein it is determined whether step 7 satisfies the requirement of a final result, and if no, the result is taken as an input to continually repeat step 4 to step 7, until a final result is obtained through continual circulation, the steps specifically comprising:

step 1: acquiring a depth image representing a distance from objects to a camera, where the depth image is a digital image with any resolution, and a depth value of each pixel point of the depth image is a linear distance in a direction where the objects are perpendicular to the principal optic axis of the camera in a current scene;

step 2: initiating a real-time depth background model, where a real-time depth background model taking a code block as a unit is initiated by using all pixel points in the depth image, where the code block refers to statistical background information of a pixel point, each pixel point has a code block, each code block comprises multiple code words, and a maximum of the number of code words is a preset determined value and determined by the imaging stability of the depth image itself, namely, higher imaging stability indicates a smaller maximum of the number of code words;

step 3: updating the real-time depth background model, where a target masking image is generated through target identification and code block information corresponding to each pixel point in the real-time depth background model is updated according to the target masking image, where the target masking image comprises a target region representing pixel points comprised by each target in the image and a non-target background region, the target region in the target masking image is updated as foreground pixel points, and the background region in the target masking image is updated as background pixel points;

step 4: acquiring a current depth image representing the distance from the objects to the camera again;

step 5: extracting a foreground image based on the real-time depth background model, where according to a depth value of any pixel point in the current depth image, all code words in a code block corresponding to the pixel point are searched and compared with the depth value to determine whether the pixel point is a background point or a foreground point, where the background point is set to a background value and the foreground point is set to a foreground value, to form the foreground image;

step 6: outputting the foreground image and generating a real-time target masking image, where target identification is performed according to the foreground image to identify a target object in the current depth image and generate the real-time target masking image, where the real-time target masking image comprises a target region for representing pixel points comprised by each target in the current depth image and a background region for representing pixel points comprised by non-targets; and step 7: updating the real-time depth background model, where code block information of each pixel point in the real-time depth background model is updated according to the real-time target masking image, where the target region in the real-time target masking image is updated as foreground pixel points, and the background region in the real-time target masking image is updated as background pixel points.

Further preferably, the image background modeling and foreground extraction method based on a depth image provided by the present invention are as follows.

In the present invention, step 3 of updating the code block information of each pixel point of the real-time depth background model refers to updating information of existing code words in the code block and increasing or reducing the number of code words in the code block, where updating code block information corresponding to the background pixel point is done by updating information of existing code words in the code block and increasing the number of code words in the code block, updating code block information corresponding to the foreground pixel point is done by reducing the number of code words in the code block, where the increasing the number of code words in the code block presupposes that a maximum of the number of code words is not exceeded, and the reducing the number of code words in the code block presupposes that the number may be reduced to 0.

The code word comprises a center threshold $Treshold_{center}$ of the code word, an occurrence number F of the code word, and a non-occurrence number L of the code word, where the updating information of existing code words in the code block refers to updating the center threshold $Treshold_{center}$ of the code word, the occurrence number F of the code word, and the non-occurrence number L of the code word.

The center threshold $Treshold_{center}$ of the code word is used to determine whether a depth value of a corresponding pixel value belongs to the code word by determining whether the depth value is in a high to low threshold range taking the center threshold of the code word as a center, where with the center threshold being $Treshold_{center}$, a calculation formula of a low threshold $Treshold_{low}$ is as follows:

$$Treshold_{low} = Treshold_{center} - D$$

in which D is a depth threshold corresponding to a depth value of a current pixel point, the depth threshold is a preset numerical value according to different depth value, and when a calculation result of the low threshold is less than 0, the low threshold is 0; a calculation formula of a corresponding high threshold is as follows:

$$Treshold_{high} Treshold_{center} + D$$

in which when a calculation result of the high threshold is greater than a possible maximum depth value, the result of the high threshold is a maximum depth value.

The occurrence number F of the code word is recorded as an occurrence number of all depth values belonging to the code word, where each depth value belonging to the code word is in the high to low threshold range taking $Treshold_{center}$ of the code word as a center.

The non-occurrence number L of the code word is recorded as an occurrence number of all depth values not belonging to the code word, where when at least one code word exists in a code block corresponding to a pixel position, if an updated depth value does not belong to the code word, a non-occurrence number is recorded in the code word.

The updating information of existing code words in the code block comprises: updating a center threshold $Treshold_{center}$ of the code word, where the updating condition is that a depth value is in the range of the code word, and after the condition is satisfied, the following updating formula is used:

$$Treshold_{center} = \frac{Treshold_{center} \times F + Depth}{F + 1}$$

in which $Treshold_{center}$ on the left of the equation is a result of a center threshold after calculation, $Treshold_{center}$ on the right of the equation is a center threshold before updating, Depth is a depth value in the range of the code word, and F is a occurrence number F of the code word; updating the occurrence number F of the code word, where the updating condition is that the depth value is in the range of the code word, and after the condition is satisfied, F is increased by 1; and updating the non-occurrence number L of the code word, where if the depth value is in the range of the code word, L of the corresponding code word is set to 0, and if the depth value is not in the range of the code word, L of the all corresponding code words is increased by 1.

In the present invention, step 5 of, according to a depth value of any pixel point in the current depth image, searching and comparing all code words in a code block corresponding to the pixel point refers to comparing the depth value of the pixel point in the current depth image with high and low thresholds in all code words in the code block corresponding to the pixel point, where if the depth value is in a high to low threshold range of at least one code word, the pixel point is regarded as a background point of the current depth image; and if the depth value is not in a high to low threshold range of any code word in the code block, the pixel point is regarded as a foreground point of the current depth image.

In the present invention, step 7 of updating the real-time depth background model refers to: updating code block information corresponding to the background pixel point, by updating information of existing code words in the code block and increasing the number of code words in the code block; and updating code block information corresponding to the foreground pixel point, by reducing the number of code words in the code block.

The updating information of existing code words in the code block and increasing the number of code words in the code block refers to: if a code word having a depth value within the threshold range is found in the existing code words, updating the code word according to claim 7; if a code word having a depth value within the threshold range is not found in the existing code words and the number of code words in the code block does not reach a preset maximum, adding a code word, and initiating the code word, where a center threshold $Treshold_{center}$ of the code word is set to a current depth value, the occurrence number F of the code word is set to 1, and the non-occurrence number L of the code word is set to 0; and if a code word having a depth value within the threshold range is not found in the existing code words and the number of code words in the code block reaches the preset maximum, generating a new code word by using the current depth value to replace an original old code word.

The finding the old code word and replacing the old code word with the new code word comprises: finding a code word having a center threshold closest to the current depth value, where a difference between the center threshold and the depth value has a minimum absolute value; if the absolute value is less than a preset absolute value constant, taking a mean of the center threshold and the depth value as a center threshold of the new code word, setting F of the new code word to 1, and setting L of the new code word to 0; and if the absolute value is greater than the preset absolute value constant, searching all existing code words to find a code word having maximum L, namely, taking a code word having a maximum non-occurrence number as an old code word, and replacing the old code word with a new code word with a center threshold being the current depth value, F being set to 1, and L being set to 0.

The updating the foreground pixel point by deleting a code word refers to: analyzing information of all code words in a pixel code block to determine whether a depth value corresponding to a foreground pixel point is in the high to low threshold range corresponding to a code word; if yes, deleting the code word; and if no, doing nothing.

Compared with the prior art, the present invention has the following significant advantages.

Firstly, in the prior art, since a color image is used as a three-channel digital image, more data needs to be processed during background modeling of the color image so that the operation is highly complex and the background modeling is easily influenced by light and texture color changes so that the stability is poor; in order to solve the problems, the present invention provides a new background modeling and foreground image extraction method according to special properties of a depth image, which has stability, high efficiency, and superiority in processing positional relationships that cannot be matched by a well-known modeling method using a color image.

Secondly, the background modeling method based on a depth image of the present invention has advantages of a small calculating amount, good real time performance, and high stability and reliability for generating a foreground target.

Thirdly, the background modeling method based on a depth image of the present invention is combined with a target identification module, where the real-time depth background model can be updated according to the condition of target extraction. Therefore, compared with other existing background modeling methods based on a depth image, the present invention does not require a process of initially modeling a scene during foreground image extraction, thereby greatly simplifying the implementation steps and greatly improving the whole performance of the present invention.

DETAILED DESCRIPTION OF THE INVENTION

A detailed description of the present invention will be further given below in detail with reference to the accompanying drawings and embodiments.

Figure 2:
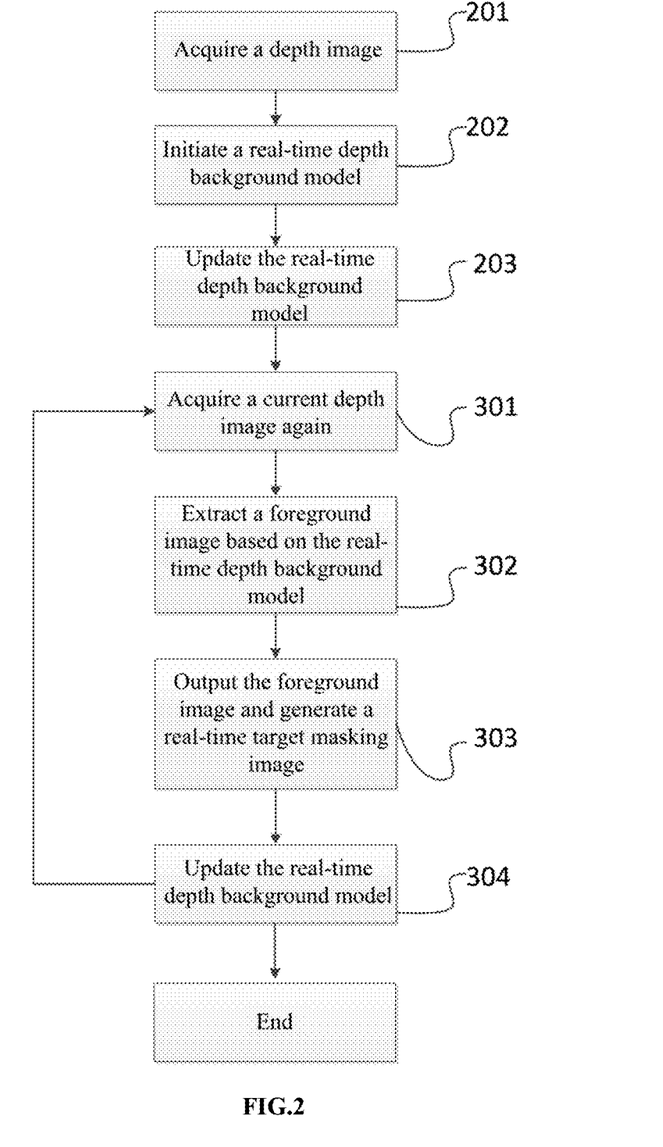
FIG. 2 is a schematic flow chart of an image background modeling and foreground extraction method based on a depth image provided by the present invention.

Referring to FIG. 2, an image background modeling and foreground extraction method based on a depth image provided by the present invention comprises step 1 to step 7, where according to the condition of a result of step 7, step 4 to step 7 can be repeated by using the result as an input, thereby obtaining a final result through continual circulation. The specific steps comprise:

step 1: acquiring a depth image representing a distance from objects to a camera, where the depth image is a digital image with any resolution, and a depth value of each pixel point of the depth image is a linear distance from the objects to a principal optic axis of the camera in a direction where the objects are perpendicular to the principal optic axis in a current scene;

step 2: initiating a real-time depth background model, where a real-time depth background model taking a code block as a unit is initiated by using all pixel points in the depth image, where the code block refers to statistical background information of a pixel point, each pixel point has a code block, each code block comprises multiple code words, and a maximum of the number of code words is a preset determined value and determined by the imaging stability of the depth image itself, namely, higher imaging stability indicates a smaller maximum of the number of code words;

step 3: updating the real-time depth background model, where a target masking image is generated through target identification and code block information corresponding to each pixel point in the real-time depth background model is updated according to the target masking image, where the target masking image comprises a target region representing pixel points comprised by each target in the image and a non-target background region, the target region in the target masking image is updated as foreground pixel points, and the background region in the target masking image is updated as background pixel points;

step 4: acquiring a current depth image representing the distance from the objects to the camera;

step 5: extracting a foreground image of the current depth image based on the real-time depth background model, where according to a depth value of any pixel point in the current depth image, all code words in a code block corresponding to the pixel point are searched and compared with the depth value to determine whether the pixel point is a background point or a foreground point, where the background point is set to a background value and the foreground point is set to a foreground value, to form the foreground image;

step 6: outputting the foreground image and generating a real-time target masking image, where target identification is performed according to the foreground image to identify a target object in the current depth image and generate the real-time target masking image, where the real-time target masking image comprises a target region for representing pixel points comprised by each target in the depth image and a background region for representing pixel points comprised by non-targets; and step 7: updating the real-time depth background model, where code block information of each pixel point in the real-time depth background model is updated according to the real-time target masking image, where the target region in the real-time target masking image is updated as foreground pixel points, and the background region in the real-time target masking image is updated as background pixel points.

Figure 1:
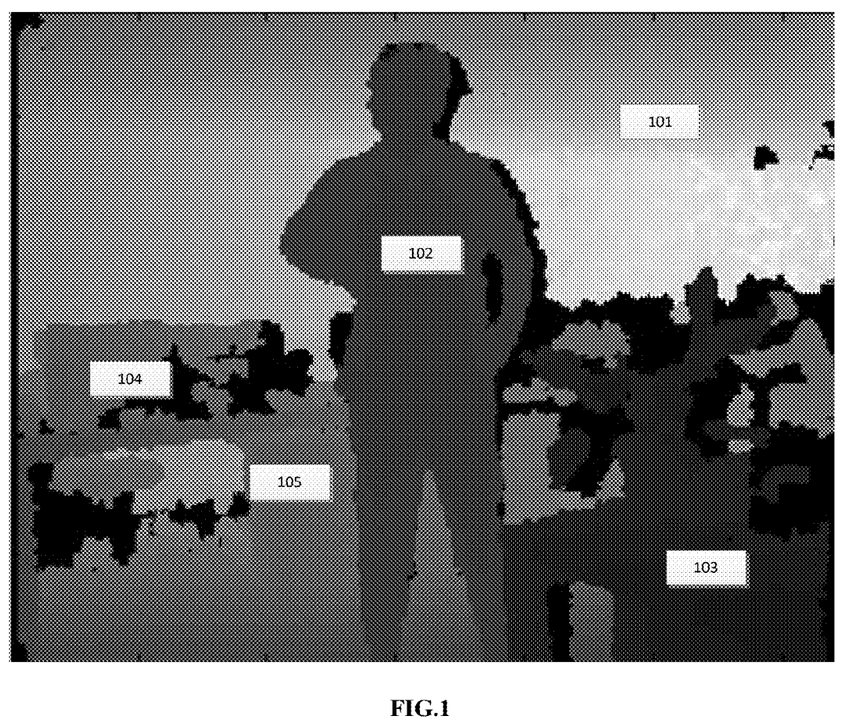
FIG. 1 is a schematic view of a background wall in a scene.

Referring to FIG. 1 and FIG. 2, the image background modeling and foreground extraction method based on a depth image provided by the present invention and a specific preferred embodiment in applications thereof are further described as follows.

1. A whole algorithm process of target extraction based on a depth image. The main function of the present invention is to assist other algorithm modules in extracting a certain target in a depth image, which is specifically described as follows.

As shown in FIG. 1, 101 represents a background wall in a scene, 103, 104, and 105 each represent a furniture image in the scene, and 102 represents a target person image to be extracted in the scene. In the depth image, segmentation of different target images such as 101, 102, 103, 104, and 105 is implemented in the present invention. In steps 201 and 301 in FIG. 2, the acquired depth image includes a depth image based on structured light, a depth image based on time of flight, and a depth image based on multi-camera vision.

A depth image generating apparatus based on structured light comprises a transmitting end and a receiving end. Light from the transmitting end impinges on a certain optical pattern and the pattern is projected into an application scene, objects in the scene modulate the generated optical pattern because of different distances to generate an optical pattern of the scene. Then, the generated pattern is collected by the receiving end into the depth image generating apparatus and compared with a certain reference image to obtain parallax information of the objects in the scene. A depth image of all objects in the scene can be finally obtained through the parallax information.

A depth image apparatus based time of flight comprises a transmitting end and a receiving end. The transmitting end transmits infrared light onto a scene through an infrared light component. In this embodiment, pulse infrared light may be used, so that time between an emergent light pulse and a corresponding incident light pulse can be measured, and the time is used to determine a physical distance from the depth image apparatus to a certain position on a target or an object in the scene. A phase of an emergent light wave may also be compared with a phase of an incident light wave to determine a phase shift, and then the phase shift may be used to determine a physical distance from the depth image apparatus to a certain position on a target or an object in the scene. The time-of-flight analysis may also be used to analyze the intensity of reflected beams with time through various techniques including, for example, shutter-type light pulse imaging, to indirectly determine a physical distance from the depth image apparatus to a certain position on a target or an object in the scene.

For the depth image based on multi-camera vision, in this embodiment, images in a scene can be captured by multiple cameras at different positions, and the distance from the object in the scene to the depth image apparatus is obtained through correlation matching according to a positional relationship among the cameras.

The finally obtained depth image is in a form of a two-dimensional matrix. A point at each position of the matrix is a pixel point of the image, and a numerical value of the pixel point represents a physical distance from an object in the scene to the depth image apparatus.

Returning to FIG. 2, in step 202, a real-time depth background model is initiated. The real-time depth background model taking a code block as a unit is initiated by using all pixel points in the depth image. The code block refers to statistical background information of a pixel point, each pixel point has a code block, each code block comprises multiple code words, and a maximum of the number of code words is a preset determined value and determined by the imaging stability of the depth image itself, namely, higher imaging stability indicates a smaller maximum of the number of code words.

After the real-time depth background model is initiated, the process goes to step 203 of updating the real-time depth background model, where a target masking image is generated through target identification and code block information corresponding to each pixel point in the real-time depth background model is updated according to the target masking image, where the target masking image comprises a target region representing pixel points comprised by each target in the image and a non-target background region, the target region in the target masking image is updated as foreground pixel points, and the background region in the target masking image is updated as background pixel points.

After step 203 of updating the real-time depth background model, an available real-time depth background model is obtained for subsequent real-time image background modeling and foreground extraction.

In step 301, a new depth image is acquired. In step 302, a foreground image extracting module performs a foreground extraction operation based on the built real-time depth background model, by comparing a pixel point of the current depth image with code words in the real-time depth background model, which will be described below in detail. A foreground image is finally output. In the foreground image, pixels are marked with different numerical values to distinguish foreground pixels from background pixels.

After the foreground image is extracted, the process goes to step 303 of outputting the foreground image and generating a real-time target masking image. The step can be done in various manners. According to the foreground image, target identification is performed and a target object (for example, a human body target) to be extracted is output. In some examples, a result of the foreground may be used as a result of the target identification. In some examples, outline information of a human body can be used to perform target identification. Since the head and the shoulders of a human body meet a certain shape constraint, identification can be performed by extracting head and shoulder features and performing feature matching by using a predefined head and shoulder model. In some examples, a target can be identified according to moving or non-moving objects. Compared with the background, a moving object is more likely a human body target or a target to be identified. In some examples, a target can be identified by using information of a last frame. A target position of the last frame may be taken as a target position of a current frame. The target position of a current frame can be detected by this method. In some other examples, a combination of the foregoing examples can be used to score a target object, the score is compared with a score threshold, and if the score is greater than the threshold, the target object is identified. Finally, a target identification module outputs a target object with a continuous depth and generates a masking image with the position of the target object. Target object pixels and non-target object pixels are marked with different numerical values, respectively.

After the target identification is finished, the process goes to step 304 of updating the real-time depth background model, where an identified target is used in the updating process. Pixels in the target object are not used to update the real-time depth background model, and pixels in the non-target object (i.e., the background) are used to update the real-time depth background model. The real-time depth background model will be used for calculation of foreground extraction of a next frame.

2. Information composition of the real-time depth background model. The real-time depth background model is a set of data taking a code block as a unit and built according to the number of pixel points of an image. Each pixel point has a code block. The code block is a basic unit of statistical background information of a single pixel point.

Each code block comprises multiple code words. A maximum of the number of code words is a preset determined value. For each pixel, the code block is used to represent all information of the pixel in the real-time depth background model. One code block is formed of multiple code words. Each code word represents the range, an occurrence frequency, and the stale of a depth value of the pixel when it belongs to the background. Real-time depth background models at multiple time nodes can be built through performance of multiple code words.

A maximum of the number of code words is determined by the imaging stability of the depth image itself. Higher imaging stability indicates a smaller maximum of the number of code words. The generated code block is stored in a fixed storage space.

The code word comprises the following information: a center threshold $Treshold_{center}$ of the code word, an occurrence number F of the code word, and a non-occurrence number L of the code word.

The center threshold is used to determine whether a depth value of a corresponding pixel value belongs to the code word by determining whether the depth value is in a high to low threshold range taking the center threshold of the code word as a center, where with the center threshold being $Treshold_{center}$, a calculation formula of a low threshold $Treshold_{low}$ is as follows:

$Treshold_{low} = Treshold_{center} - D$ in which D is a depth-range threshold corresponding to a depth value of a current pixel point and is used to control a background range taking the center threshold as a center. The depth threshold is a preset numerical value according to different depths. When a calculation result of the low threshold is less than 0, the low threshold is 0.

A calculation formula of a corresponding high threshold is as follows:

$Treshold_{high} Treshold_{center} + D$ in which when a calculation result of the high threshold is greater than a possible maximum depth value, the result of the high threshold is a maximum depth value.

The occurrence number F of the code word functions to record an occurrence number of all depth values belonging to the code word. Each depth value belonging to the code word is in the high to low threshold range taking $Treshold_{center}$ of the code word as a center. The occurrence number defines a frequency for the pixel point as the background in the depth threshold range and provides important reference for background updating and foreground extraction. A higher frequency indicates a larger number of times for the pixel point as the background. When the center threshold is updated, F is used as a mean shift statistic.

The non-occurrence number L of the code word functions to record an occurrence number of all depth values not belonging to the code word, i.e., the oldness of the code word, which represents a duration during which the depth value range is not used as the background. When at least one code word exists in a code block corresponding to a pixel position, if an updated depth value does not belong to the code word, a non-occurrence number is recorded in the code word.

3. Process of updating the real-time depth background model by the modules 204 and 304. A masking image with a pixel point at a target position removed, i.e., an image with a target position and a background of a current frame marked, is required to update the real-time depth background model. The manners of updating a target pixel point and a non-target pixel point are different. The updating of code block information of a non-target pixel point (the background) comprises:

checking whether a depth value corresponding to the target pixel point is between a high threshold and a low threshold of an existing code word;

if a code word having a depth value within the threshold range is found in the existing code words, updating the code word by updating a center threshold $Treshold_{center}$ of the code word according to the formula:

$$Treshold_{center} = \frac{Treshold_{center} \times F + Depth}{F + 1}$$

in which $Treshold_{center}$ on the left of the equation is a result of a center threshold after calculation, $Treshold_{center}$ on the right of the equation is a center threshold before updating, Depth is a depth value corresponding to the code word, and F is a occurrence number F of the code word;

updating the occurrence number F of the code word, where F is increased by 1; updating a non-occurrence number L of the code word, where if the depth value is in a high to low threshold range of a code word, L of the corresponding code word is set to 0, and if the depth value is not in high to low threshold ranges of all code words, L of the all corresponding code words is increased by 1;

if a code word having a depth value within the threshold range is not found in the existing code words and the number of code words in the code block does not reach a preset maximum, adding a code word, and initiating the code word, where a center threshold $Treshold_{center}$ of the code word is set to a current depth value, the occurrence number F of the code word is set to 1, and the non-occurrence number L of the code word is set to 0; and if a code word having a depth value within the threshold range is not found in the existing code words and the number of code words in the code block reaches the preset maximum, generating a new code word by using the current depth value to replace an original old code word.

The process of finding the old code word and replacing the old code word with the new code word comprises: finding a code word having a center threshold closest to the current depth value, where a difference between the center threshold and the depth value has a minimum absolute value; if the absolute value is less than a preset absolute value constant, taking a mean of the center threshold and the depth value as a center threshold of the new code word, setting F of the new code word to 1, and setting L of the new code word to 0; and if the absolute value is greater than the preset absolute value constant, searching all existing code words to find a code word having maximum L, namely, taking a code word having a maximum non-occurrence number as an old code word, and replacing the old code word with a new code word with a center threshold being the current depth value, F being set to 1, and L being set to 0.

Also, the updating of code block information of a target pixel point comprises:

analyzing information of all code words in a code block of a target pixel point to determine whether a depth value corresponding to the target pixel point is in a high to low threshold range corresponding to a code word; if yes, deleting the code word; and if no, doing nothing.

4. Process of foreground extraction based on the real-time depth background model by the module 302. The real-time depth background model is a set of code block information accumulated from former several frames. The background and the foreground of a current depth image can be distinguished through the model, namely, the foreground is extracted. Code block information corresponding to a pixel point at any point of the depth image is searched by using a depth value of the pixel point, and the depth value is compared with high and low thresholds of all code words in the code block. If the depth value is in a high to low threshold range of at least one code word, the pixel point is regarded as a background point of the current depth image; on the contrary, if the depth value is not in a high to low threshold range of any code word in the code block, the pixel point is regarded as a foreground point of the current depth image. The searching operation is performed for all points in the current depth image by using the same process, so that all foreground points and background points in the image can be distinguished finally, thereby completing foreground extraction of the image.

The image foreground and background detection method provided in this embodiment is completed by using the depth image and does not require a color image. Therefore, the method is not influenced by ambient light, and has a small processing volume of data. Compared with the method using the color image, the method using the depth image can generate a foreground image with higher stability and extract a foreground target in a scene more stably and rapidly.

It can be seen from the above descriptions that, the present invention achieves the following technical effects: in the case that a depth image already exists, a task of extracting a foreground target in a scene is completed, providing important reference for subsequent target identification and tracking, thereby reducing environmental influence as in the color image and having a small processing volume of data during extraction of the foregoing target in the scene, so that the detection efficiency of the foregoing target extraction is increased.

It should be noted that, persons skilled in the art can completely understand that, the modules or steps of the present invention can be implemented by a universal computing device; the modules or steps can be integrated in a single computing device or distributed onto a network consisting of multiple computing devices; and preferably, they can be implemented by program codes executable by a computing device and thus can be stored in a storing device and executed by the computing device; or they can be independently manufactured as each integrated circuit module, or multiple modules or steps thereof can be manufactured to be a single integrated circuit module, thus to be implemented. In this way, the embodiments of the present invention and features in the embodiments can be combined with one another without conflict, that is, the present invention is not limited to any particular hardware and software combination.

Descriptions not involved in the detailed description of the present invention belong to well-known techniques and can be implemented by referring to well-known techniques.

The present invention has been repeatedly tested with satisfactory test effects.

The above detailed description and embodiments are intended to support the technical ideas of the image background modeling and foreground extraction method based on a depth image provided by the present invention, and not to limit the scope of the present invention. All equivalent changes or modifications made on the basis of the present technical solutions according to the technical ideas provided by the present invention fall within the scope of the technical solutions of the present invention.

What is claimed is:

1. An image background modeling and foreground extraction method based on a depth image, characterized by comprising step 1 to step 7, wherein it is determined whether step 7 satisfies the requirement of a final result, and if no, the result is taken as an input to continually repeat step 4 to step 7, until a final result is obtained through continual circulation, the steps specifically comprising:

step 1: acquiring a depth image representing a distance from objects to a camera, wherein the depth image is a digital image with any resolution, and a depth value of each pixel point of the depth image is a linear distance in a direction where the objects are perpendicular to the principal optic axis of the camera in a current scene;

step 2: initiating a real-time depth background model, wherein a real-time depth background model taking a code block as a unit is initiated by using all pixel points in the depth image, wherein the code block refers to statistical background information of a pixel point, each pixel point has a code block, each code block comprises multiple code words, and a maximum of the number of code words is a preset determined value and determined by the imaging stability of the depth image itself, namely, higher imaging stability indicates a smaller maximum of the number of code words;

step 3: updating the real-time depth background model, wherein a target masking image is generated through target identification and code block information corresponding to each pixel point in the real-time depth background model is updated according to the target masking image, wherein the target masking image comprises a target region representing pixel points comprised by each target in the image and a non-target background region, the target region in the target masking image is updated as foreground pixel points, and the background region in the target masking image is updated as background pixel points;

step 4: acquiring a current depth image representing the distance from the objects to the camera again;

step 5: extracting a foreground image based on the real-time depth background model, wherein according to a depth value of any pixel point in the current depth image, all code words in a code block corresponding to the pixel point are searched and compared with the depth value to determine whether the pixel point is a background point or a foreground point, wherein the background point is set to a background value and the foreground point is set to a foreground value, to form the foreground image;

step 6: outputting the foreground image and generating a real-time target masking image, wherein target identification is performed according to the foreground image to identify a target object in the current depth image and generate the real-time target masking image, wherein the real-time target masking image comprises a target region for representing pixel points comprised by each target in the current depth image and a background region for representing pixel points comprised by non-targets; and step 7: updating the real-time depth background model, wherein code block information of each pixel point in the real-time depth background model is updated according to the real-time target masking image, wherein the target region in the real-time target masking image is updated as foreground pixel points, and the background region in the real-time target masking image is updated as background pixel points.

2. The depth background modeling and foreground extraction method according to claim 1, characterized in that, step 7 and step 3 of updating the code block information of each pixel point of the real-time depth background model refers to updating information of existing code words in the code block and increasing or reducing the number of code words in the code block, wherein updating code block information corresponding to the background pixel point is done by updating information of existing code words in the code block and increasing the number of code words in the code block, updating code block information corresponding to the foreground pixel point is done by reducing the number of code words in the code block, wherein the increasing the number of code words in the code block presupposes that a maximum of the number of code words is not exceeded, and the reducing the number of code words in the code block presupposes that the number may be reduced to 0.

3. The depth background modeling and foreground extraction method according to claim 2, characterized in that, the code word comprises a center threshold $Treshold_{center}$ of the code word, an occurrence number F of the code word, and a non-occurrence number L of the code word, wherein the updating information of existing code words in the code block refers to updating the center threshold $Treshold_{center}$ of the code word, the occurrence number F of the code word, and the non-occurrence number L of the code word.

4. The depth background modeling and foreground extraction method according to claim 3, characterized in that, the center threshold $Treshold_{center}$ of the code word is used to determine whether a depth value of a corresponding pixel value belongs to the code word by determining whether the depth value is in a high to low threshold range taking the center threshold of the code word as a center, wherein with the center threshold being $Treshold_{center}$, a calculation formula of a low threshold $Treshold_{low}$ is as follows:

$$Treshold_{low} = Treshold_{center} - D$$

in which D is a depth threshold corresponding to a depth value of a current pixel point, the depth threshold is a preset numerical value according to different depth value, and when a calculation result of the low threshold is less than 0, the low threshold is 0; a calculation formula of a corresponding high threshold is as follows:

$$Treshold_{high} = Treshold_{center} + D$$

in which when a calculation result of the high threshold is greater than a possible maximum depth value, the result of the high threshold is a maximum depth value.

5. The depth background modeling and foreground extraction method according to claim 4, characterized in that, the occurrence number F of the code word is recorded as an occurrence number of all depth values belonging to the code word, wherein each depth value belonging to the code word is in the high to low threshold range taking $Treshold_{center}$ of the code word as a center.

6. The depth background modeling and foreground extraction method according to claim 5, characterized in that, the non-occurrence number L of the code word is recorded as an occurrence number of all depth values not belonging to the code word, wherein when at least one code word exists in a code block corresponding to a pixel position, if an updated depth value does not belong to the code word, a non-occurrence number is recorded in the code word.

7. The depth background modeling and foreground extraction method according to claim 2, characterized in that, the updating information of existing code words in the code block comprises: updating a center threshold $Treshold_{center}$ of the code word, wherein the updating condition is that a depth value is in the range of the code word, and after the condition is satisfied, the following updating formula is used:

$$Treshold_{center} = \frac{Treshold_{center} \times F + \text{Depth}}{F + 1}$$

in which $Treshold_{center}$ on the left of the equation is a result of a center threshold after calculation, $Treshold_{center}$ on the right of the equation is a center threshold before updating, Depth is a depth value in the range of the code word, and F is a occurrence number F of the code word; updating the occurrence number F of the code word, wherein the updating condition is that the depth value is in the range of the code word, and after the condition is satisfied, F is increased by 1; and updating the non-occurrence number L of the code word, wherein if the depth value is in the range of the code word, L of the corresponding code word is set to 0, and if the depth value is not in the range of the code word, L of the all corresponding code words is increased by 1.

8. The depth background modeling and foreground extraction method according to claim 4, characterized in that, step 5 of, according to a depth value of any pixel point in the current depth image, searching and comparing all code words in a code block corresponding to the pixel point refers to comparing the depth value of the pixel point in the current depth image with high and low thresholds in all code words in the code block corresponding to the pixel point, wherein if the depth value is in a high to low threshold range of at least one code word, the pixel point is regarded as a background point of the current depth image; and if the depth value is not in a high to low threshold range of any code word in the code block, the pixel point is regarded as a foreground point of the current depth image.

9. The depth background modeling and foreground extraction method according to claim 1, characterized in that, step 7 of updating the real-time depth background model refers to: updating code block information corresponding to the background pixel point, by updating information of existing code words in the code block and increasing the number of code words in the code block; and updating code block information corresponding to the foreground pixel point, by reducing the number of code words in the code block.

10. The depth background modeling and foreground extraction method according to claim 9, characterized in that, the updating information of existing code words in the code block and increasing the number of code words in the code block refers to:

if a code word having a depth value within the threshold range is found in the existing code words, updating the code word according to the following formula:

$$\text{Treshold}_{center} = \frac{\text{Treshold}_{center} \times F + \text{Depth}}{F + 1}$$

in which $\text{Treshold}_{center}$ on the left of the equation is a result of a center threshold after calculation, $\text{Treshold}_{center}$ on the right of the equation is a center threshold before updating, Depth is a depth value in the range of the code word, and F is a occurrence number F of the code word; updating the occurrence number F of the code word, wherein the updating condition is that the depth value is in the range of the code word, and after the condition is satisfied, F is increased by 1; and updating the non-occurrence number L of the code word, wherein if the depth value is in the range of the code word, L of the corresponding code word is set to 0, and if the depth value is not in the range of the code word, L of the all corresponding code words is increased by 1;

if a code word having a depth value within the threshold range is not found in the existing code words and the number of code words in the code block does not reach a preset maximum, adding a code word, and initiating the code word, wherein a center threshold $\text{Treshold}_{center}$ of the code word is set to a current depth value, the occurrence number F of the code word is set to 1, and the non-occurrence number L of the code word is set to 0; and if a code word having a depth value within the threshold range is not found in the existing code words and the number of code words in the code block reaches the preset maximum, generating a new code word by using the current depth value to replace an original old code word.

11. The depth background modeling and foreground extraction method according to claim 10, characterized in that, the finding the old code word and replacing the old code word with the new code word comprises:

finding a code word having a center threshold closest to the current depth value, wherein a difference between the center threshold and the depth value has a minimum absolute value; if the absolute value is less than a preset absolute value constant, taking a mean of the center threshold and the depth value as a center threshold of the new code word, setting F of the new code word to 1, and setting L of the new code word to 0; and if the absolute value is greater than the preset absolute value constant, searching all existing code words to find a code word having maximum L, namely, taking a code word having a maximum non-occurrence number as an old code word, and replacing the old code word with a new code word with a center threshold being the current depth value, F being set to 1, and L being set to 0.

12. The depth background modeling and foreground extraction method according to claim 9, characterized in that, the updating the foreground pixel point by deleting a code word refers to: analyzing information of all code words in a pixel code block to determine whether a depth value corresponding to a foreground pixel point is in the high to low threshold range corresponding to a code word; if yes, deleting the code word; and if no, doing nothing.

* * * * *